Patented Dec. 27, 1927.

1,654,287

UNITED STATES PATENT OFFICE.

IVAN GUBELMANN, HENRY J. WEILAND, AND OTTO STALLMANN, OF SOUTH MILWAUKEE, WISCONSIN, ASSIGNORS TO THE NEWPORT COMPANY, OF CARROLLVILLE, WISCONSIN, A CORPORATION OF DELAWARE.

3'-NITRO-4'-HYDROXY-ORTHO-BENZOYL BENZOIC ACID AND PROCESS OF MAKING THE SAME.

No Drawing.    Application filed June 28, 1926.    Serial No. 119,247.

We have discovered that 3'-nitro-4'-hydroxy-ortho-benzoyl benzoic acid may be prepared by treating 3'-nitro-4'-chloro-ortho-benzoyl benzoic acid or its salts in a water solution with alkalies. The reaction may also be carried out in alcoholic solution but the concentration of the alkali must be very carefully controlled or else the alkyl ether will be formed as a by-product. The reaction proceeds at various temperatures, slowly at room temperature, and more rapidly at higher temperatures. In carrying out the reaction, any suitable alkali may be used, such as caustic soda, or potash, sodium or potassium carbonate or bicarbonate, hydroxides of the alkaline earth metals or the like, all of these alkalies giving the same end product.

The general reaction may be expressed by the following chemical equation, in which M represents a metallic radical.

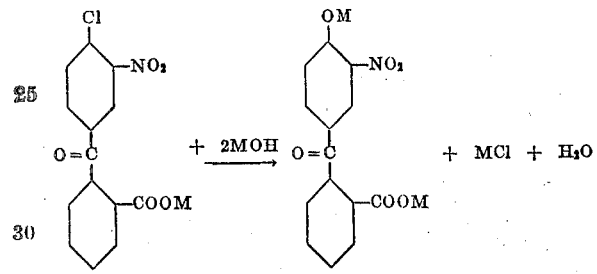

It is obvious that, instead of starting with 3'-nitro-4'-chloro-ortho-benzoyl-benzoic acid, another halogen derivative may be employed.

3'-nitro-4'-hydroxy-ortho-benzoyl-benzoic acid crystallizes from alcohol in pale yellow needles having a melting point of about 175° C. It is soluble in most organic solvents and also in dilute caustic soda, soda ash, and ammonia, the solution of the soda salt in water having a deep yellow color. From its alkaline solution, the hydroxy-body cannot be salted out by the addition of an excess of caustic soda or by the addition of salt.

Without limiting our invention to any particular procedure, the following example, in which parts by weight are given, illustrates the application of our invention in the preferred form:

A mixture prepared from 305 parts of 3'-nitro-4'-chloro-ortho-benzoyl-benzoic acid, 500 parts of water and 100 parts of caustic soda is heated up to the boiling point for a period of 1 to 2 hours. After this period it was found by analysis that the theoretical amount of caustic soda had been consumed and the corresponding amount of sodium chloride had been formed. The solution which is dark red in color, is then run into a mixture of 200 parts of hydrochloric acid 20° Bé. and 1000 parts of ice. The end product which precipitates out is then filtered and the filter cake washed with 500 parts of cold water. After washing, the product is dried at 100° C. The yield is about 272 parts of crude 3'-nitro-4'-hydroxy-ortho-benzoyl-benzoic acid having a melting point on the crude of 165–170° C. Upon recrystallization from dilute alcohol of this crude product, the pure product having a melting point of 175° C. may be obtained.

We are aware that numerous details of the process may be varied without departing from the spirit of this invention, and we do not desire limiting the patent granted other than as necessitated by the prior art.

We claim as our invention:

As a new article of manufacture, 3'-nitro-4'-hydroxy-ortho-benzoyl-benzoic acid, having most probably the following formula:

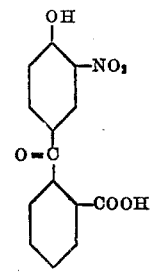

In testimony whereof we have hereunto subscribed our names.

IVAN GUBELMANN.
HENRY J. WEILAND.
OTTO STALLMANN.